United States Patent
Wang et al.

(10) Patent No.: US 9,928,088 B2
(45) Date of Patent: Mar. 27, 2018

(54) METHOD, APPARATUS, SERVER AND SYSTEM FOR IMPLEMENTING WEB APPLICATION

(71) Applicant: Baidu Online Network Technology (Beijing) Co., Ltd, Beijing (CN)

(72) Inventors: Jigu Wang, Beijing (CN); Minliang Chen, Beijing (CN); Pengzhan Li, Beijing (CN); Jiachen Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 276 days.

(21) Appl. No.: 14/585,027

(22) Filed: Dec. 29, 2014

(65) Prior Publication Data

US 2015/0248302 A1   Sep. 3, 2015

(30) Foreign Application Priority Data

Mar. 3, 2014 (CN) .......................... 2014 1 0075211

(51) Int. Cl.
   *G06F 15/16* (2006.01)
   *G06F 9/445* (2018.01)
   *G06F 17/30* (2006.01)

(52) U.S. Cl.
   CPC ............ *G06F 9/44536* (2013.01); *G06F 8/60* (2013.01); *G06F 17/30899* (2013.01)

(58) Field of Classification Search
   CPC ... G06F 8/61; G06F 8/65; G06F 9/445; H04L 67/10; H04L 67/34; H04W 4/001; H04W 4/003
   See application file for complete search history.

(56) References Cited

U.S. PATENT DOCUMENTS

2008/0222628 A1* 9/2008 Batra ..................... G06F 8/60
                                                       717/171
2009/0172519 A1   7/2009 Xu et al.
(Continued)

FOREIGN PATENT DOCUMENTS

WO    WO 2013/157678 A1   10/2013

OTHER PUBLICATIONS

EP, Extended European Search Report, European Application No. 14200678.2, dated Mar. 6, 2015.
(Continued)

*Primary Examiner* — Suraj Joshi
*Assistant Examiner* — Ayele Woldemariam
(74) *Attorney, Agent, or Firm* — Orrick, Herrington & Sutcliffe LLP

(57) ABSTRACT

A method, apparatus, server and system for implementing a web application. The method, for example, comprises: detecting an operating environment of a current web application; and automatically loading a component of a native version when it is detected that the current web application is operating on a light application platform; and automatically loading a component of a hypertext markup language (HTML) version when it is detected that the current web application is operating on a browser. By automatically loading the component of a native version and automatically loading the component of the HTML version, the disclosed method improves the compatibility of the web application so that the web application may complete the function thereof in various environments; and adopting an HTML tag development component reduces the development costs of the web application and increases the loading speed of the web application.

20 Claims, 6 Drawing Sheets

(56) References Cited

U.S. PATENT DOCUMENTS

| | | | | |
|---|---|---|---|---|
| 2009/0199080 | A1* | 8/2009 | Fox | G06F 8/38 709/203 |
| 2009/0228779 | A1* | 9/2009 | Williamson | G06F 9/54 707/999.2 |
| 2012/0297030 | A1* | 11/2012 | Knobel | G06F 8/65 709/219 |
| 2013/0198720 | A1 | 8/2013 | Maurice et al. | |
| 2013/0311985 | A1* | 11/2013 | Aleksandrov | G06F 8/65 717/173 |
| 2014/0149998 | A1* | 5/2014 | Kumar | G06F 21/31 719/318 |
| 2014/0280477 | A1* | 9/2014 | Chiussi | H04L 67/34 709/203 |

OTHER PUBLICATIONS

Lubbers, Peter: "Using HTML5 Application Cache to Create Offline Web Applications—Provides an easy way to prefetch some or all of your web app's assets," PeterLubbers Ulitzer articles online, Dec. 22, 2010; retrieved from the Internet: URL:http://peterlubbers.ulitzer.com/node/1643966.

JP, Notice of Grounds for Rejection, Japanese Application No. 2014-264833, dated Jan. 24, 2017.

Author Unknown, "Changing Future brought by IE5 and XML", ASCII, ASCII Corporation, Aug. 1, 1998, vol. 22, No. 8, pp. 293-297.

Hikoki, Kujira, "Off-line Operation of Web Application using Application Cache", Nikkei Software, Nikkei BP, Inc., Jun. 24, 2012, vol. 15, No. 8, pp. 98-103.

Nishihata, Kazuma, "A Stylish Website if Realized!—CSS Design Techniques that you can use immediately", Web Creators, MDN Corporation, Jun. 1, 2009, vol. 90. pp. 114-117.

Sakatoku, Mineaki, "Basic of AIR Application Development using Aptana Studio & Flex Builder", DB Magazine, Shoeisha Co., Ltd., Jun. 1, 2009, vol. 9, No. 2, pp. 28-36.

Communication pursuant to Article 94(3) EPC, Application No. 14 200 678.2, dated Oct. 20, 2017.

Notice of Grounds for Rejection, Patent Application No. 2014-264833, dated Nov. 14, 2017.

Author Unknown, "Changing Usability brought by HTML5"; Web Designing; Mynavi Corporation; Jan. 1, 2013; vol. 13, No. 1; pp. 062-063.

* cited by examiner

METHOD, APPARATUS, SERVER AND SYSTEM FOR IMPLEMENTING WEB APPLICATION

CROSS-REFERENCE TO RELATED APPLICATIONS

The present application claims priority to Chinese Patent Application No. CN201410075211.1, filed on Mar. 3, 2014, the entire disclosure of which is incorporated herein by reference in its entirety and for all purposes.

TECHNICAL FIELD

The present invention relates to the technical field of mobile Internet, and in particular to a method, apparatus, server and system for implementing a web application.

BACKGROUND

As mobile terminals become increasingly intelligent, various mobile applications become increasingly abundant. At present, applications (APPs) are classified according to development approaches, mainly comprising:
  1. Native applications (Native APPs)
  2. Web applications (Web APPs)
  3. Hybrid applications (Hybrid APPs)
  4. Light applications (Light APPs)

A native application (Native APP) is mainly written in a native program and is installed and operated after being downloaded to a mobile terminal by a user, and it can provide different experiences for different mobile operating systems. A web application (Web APP) is an application developed on the basis of web technologies for implementing particular functions, and the APP can be accessed via a webpage without having to be downloaded by a user. A hybrid application (Hybrid APP) embeds a page into a shell program thereof on the basis of the web application, so that the shell program can complete a function which cannot be implemented on the page, thus needing a user to download a shell program installation package. A light application (Light APP) is an APP which is used upon searching without the need to be downloaded; like a web application, a light application does not need to be downloaded, and can give the same experience as that of a native application as well, and thus interface development can be implemented using a light component.

However, a native application has high development costs, a long maintenance time period and a poor cross-platform compatibility. A web application is limited by the hardware performance of a mobile terminal during operation, for example, the animation effects are not played smoothly enough, and the like. Sometimes the actual functions of the application cannot even be implemented, and a development team needs to utilize elements in the webpage and maintain a large number of script program codes to implement the functions, thus increasing the workload of the development team. Although a hybrid application utilizes the convenience of webpage typography during development to reduce the development costs, it still needs to be downloaded by a user to a mobile terminal and installed for operation; and from the perspective of the user, the experience is not improved compared with a native application. A light application extends native functions but has poor compatibility when accessing a light component development interface via some browsers, and sometimes the interface may be missing, and even basic functions may be influenced.

SUMMARY

The present invention is intended to solve one of the technical problems in the related art at least to some extent. For this purpose, an objective of the present invention is to propose a method for implementing a web application. The method can improve the compatibility of the web application so that the web application may complete the function thereof in various environments; and adopting an HTML tag development component can reduce the development costs of the web application and increase the loading speed of the web application.

A second objective of the present invention is to propose an apparatus for implementing a web application.

A third objective of the present invention is to propose a method for implementing a web application.

A fourth objective of the present invention is to propose a server.

A third objective of the present invention is to propose a system for implementing a web application.

In order to achieve the above-mentioned objectives, a method for implementing a web application of a first aspect embodiment of the present invention comprises: detecting an operating environment of a current web application; and automatically loading a component of a native version when it is detected that the current web application is operating on a light application platform; and automatically loading a component of a hypertext markup language (HTML) version when it is detected that the current web application is operating on a browser.

By means of automatically loading the component of a native version when it is detected that the web application is operating on a light application platform and automatically loading the component of an HTML version when it is detected that the web application is operating on a browser, the method for implementing a web application in the embodiment of the present invention improves the compatibility of the web application so that the web application may complete the function thereof in various environments; and adopting an HTML tag development component reduces the development costs of the web application and increases the loading speed of the web application.

In order to achieve the above-mentioned objectives, an apparatus for implementing a web application of a second aspect embodiment of the present invention comprises: a detection module, for detecting an operating environment of a current web application; and a loading module, for automatically loading a component of a native version when the detection module has detected that the current web application is operating on a light application platform; and automatically loading a component of a hypertext markup language (HTML) version when the detection module has detected that the current web application is operating on a browser.

By means of automatically loading the component of a native version when it is detected that the web application is operating on a light application platform and automatically loading the component of an HTML version when it is detected that the web application is operating on a browser, the apparatus for implementing a web application in the embodiment of the present invention improves the compatibility of the web application so that the web application may complete the function thereof in various environments; and adopting an HTML tag development component reduces the development costs of the web application and increases the loading speed of the web application.

In order to achieve the above-mentioned objectives, a method for implementing a web application of a third aspect embodiment of the present invention comprises: receiving a loading request sent by a client, and acquiring a component of a corresponding version according to the loading request; and sending the component of the corresponding version to the client so as to enable the client to load the component of the corresponding version.

By sending the component of the corresponding version to the client so as to enable the client to load the component of the corresponding version, the method for implementing a web application in the embodiment of the present invention improves the compatibility of the web application so that the web application may complete the function thereof in various environments; and adopting an HTML tag development component reduces the development costs of the web application and increases the loading speed of the web application.

In order to achieve the above-mentioned objectives, a server of a fourth aspect embodiment of the present invention comprises: an acquisition module, for receiving a loading request sent by a client, and acquiring a component of a corresponding version according to the loading request; and a sending module, for sending the component of the corresponding version to the client so as to enable the client to load the component of the corresponding version.

By sending the component of the corresponding version to the client so as to enable the client to load the component of the corresponding version, the server of the embodiment of the present invention improves the compatibility of the web application so that the web application may complete the function thereof in various environments; and adopting an HTML tag development component reduces the development costs of the web application and increases the loading speed of the web application.

In order to achieve the above-mentioned objectives, a system for implementing a web application of a fifth aspect embodiment of the present invention comprises: a client where the apparatus for implementing a web application is located and a server.

By means of automatically loading the component of a native version when it is detected that the web application is operating on a light application platform and automatically loading the component of an HTML version when it is detected that the web application is operating on a browser, the system for implementing a web application in the embodiment of the present invention improves the compatibility of the web application so that the web application may complete the function thereof in various environments; and adopting an HTML tag development component reduces the development costs of the web application and increases the loading speed of the web application.

BRIEF DESCRIPTION OF THE ACCOMPANYING DRAWINGS

DETAILED DESCRIPTION OF THE PREFERRED EMBODIMENTS

Figure 1A:
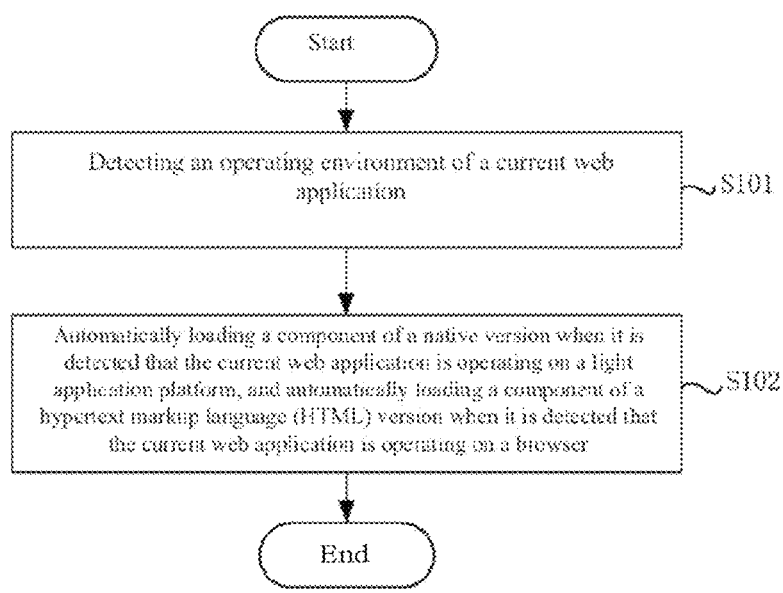
FIG. 1a is a flowchart of a method for implementing a web application according to an embodiment of the present invention.

The embodiments of the present invention will be described in detail below, and examples of the embodiments are shown in the accompanying drawings, in which the same or similar reference numerals represent the same or similar elements or elements having the same or similar functions throughout. The embodiments described below by referring to the accompanying drawings are exemplary and are intended to explain the present invention, rather than being understood as limitations to the present invention.

The method, apparatus, server and system for implementing a web application in the embodiments of the present invention are described with reference to the accompanying drawings below.

FIG. 1 is a flowchart of a method for implementing a web application according to an embodiment of the present invention.

As shown in FIG. 1, the method for implementing a web application comprises:

S101, an operating environment of a current web application is detected.

Figure 1B:
FIG. 1b is a schematic diagram of an APP operating on a light application platform according to an embodiment of the present invention.

In the embodiments of the present invention, a web application (WebApp) may be operated via a light application platform and may also be operated via a browser. It should be noted that the light application platform is not a browser but is an application which can browse webpages, and FIG. 1b illustrates an APP (application) which is operating on a light application platform.

When a light component located in a current WebApp has detected that the current WebApp is operated via a light application platform, a component of a native version needs to be loaded; and when it is detected that the current WebApp is operated via a browser, an HTML (hypertext markup language) version component needs to be loaded.

Therefore, the light component needs to detect the operating environment of the current web application so as to determine the version of the component to be loaded.

S102, when it is detected that the current web application is operating on a light application platform, the component of a native version is automatically loaded; and when it is detected that the current web application is operating on a browser, the component of a hypertext markup language (HTML) version is automatically loaded.

In the embodiments of the present invention, when the light component detects that the current web application is operating on a light application platform, the component of a native version may be automatically loaded via a script. Specifically, if a corresponding component of a native version exists locally, the component of a native version may be automatically loaded from the local site, for example, if a certain component of a native version has appeared in a previous WebApp, then the component of a native version may be directly loaded from the local site; and if the component of a native version does not exist locally, the component of a native version may be automatically loaded from a server. By the same reasoning, having detected that the current web application is operating on a browser, the light component may automatically load the component of a hypertext markup language (HTML) version via a script. Specifically, if the component of an HTML version exists locally, the component of an HTML version is automatically loaded from the local site; and if the component of an HTML version does not exist locally, the component of an HTML version is automatically loaded from a server.

Figure 2:
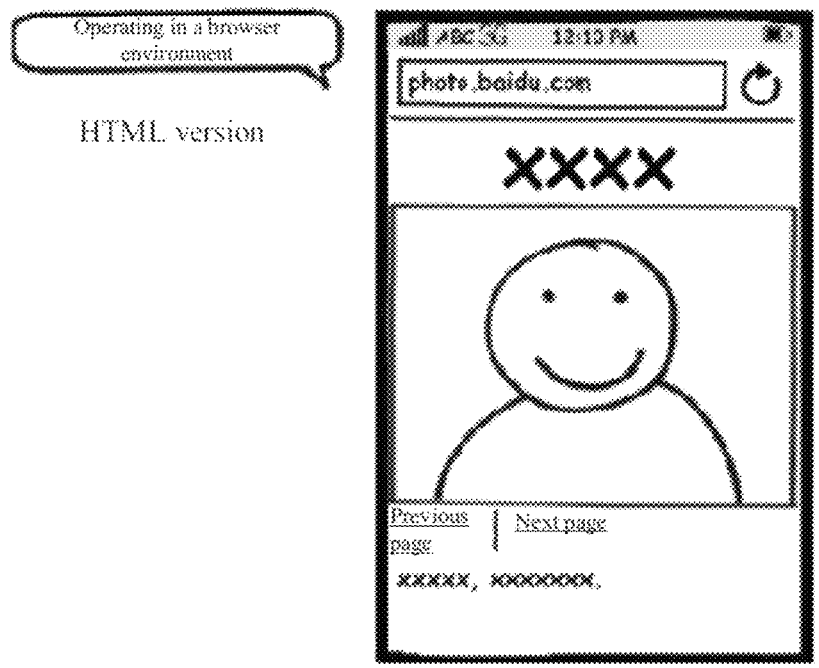
FIG. 2 is an effect diagram illustrating when a web application is operating on a browser.
Figure 3:
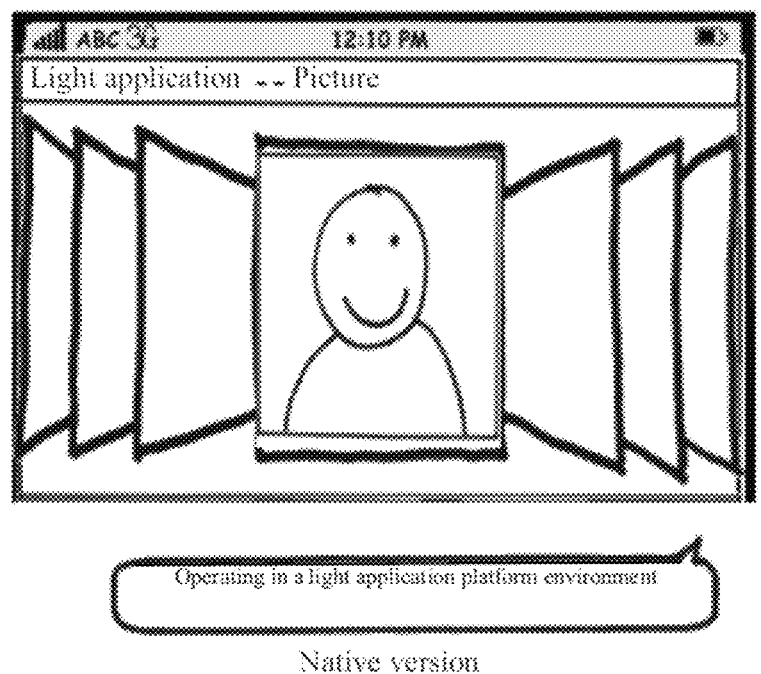
FIG. 3 is an effect diagram illustrating when a web application is operating on a light application platform.

FIG. 2 is an effect diagram illustrating when a web application is operating on a browser. As shown in FIG. 2, the web application operating on a browser merely completes basic application functions, and the displayed effect is relatively simple. However, FIG. 3 is an effect diagram illustrating when a web application is operating on a light application platform. As shown in FIG. 3, the effect of displaying a picture by means of the web application operating on a light application platform has achieved the effect of a native application, and thus the user experience is improved.

By means of automatically loading the component of a native version when it is detected that the web application is operating on a light application platform and automatically loading the component of an HTML version when it is detected that the web application is operating on a browser, the method for implementing a web application in the embodiment of the present invention improves the compatibility of the web application so that the web application may complete the function thereof in various environments; and adopting an HTML tag development component reduces the development costs of the web application and increases the loading speed of the web application.

Figure 4:
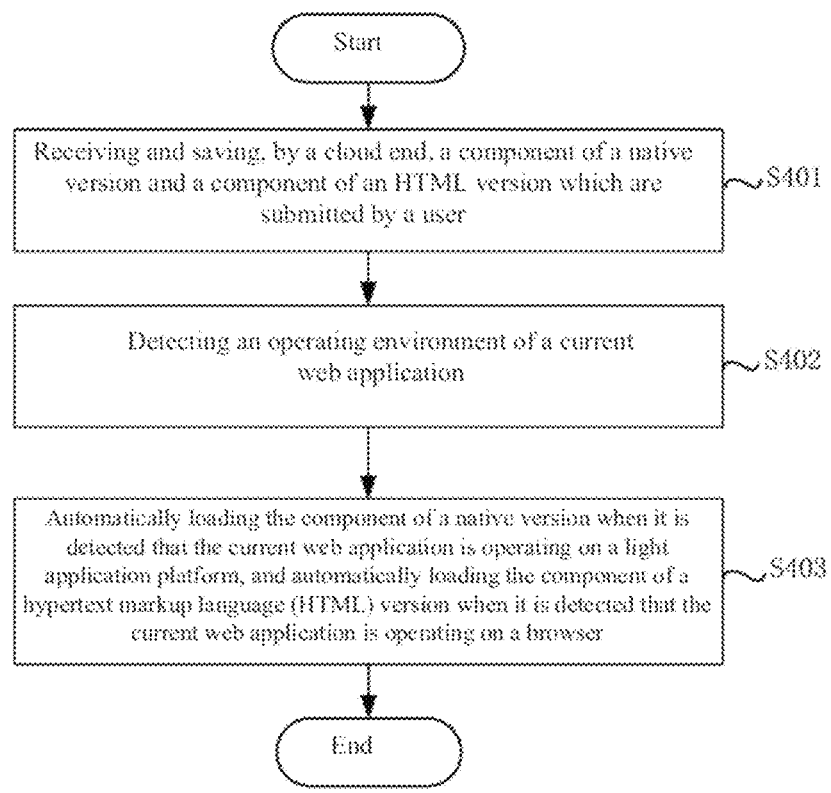
FIG. 4 is a flowchart of a method for implementing a web application according to another embodiment of the present invention.

FIG. 4 is a flowchart of a method for implementing a web application according to another embodiment of the present invention.

As shown in FIG. 4, the method for implementing a web application comprises:

S401, a server receives and saves a component of a native version and a component of an HTML version which are submitted by a user.

Figure 5:
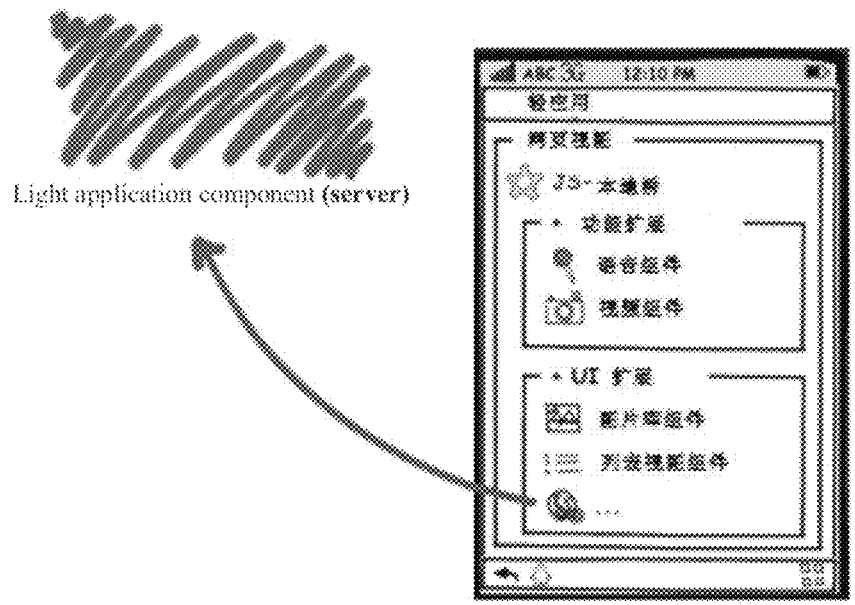
FIG. 5 is an effect schematic diagram illustrating that a server receives a component of a native version and a component of an HTML version which are submitted by a user.

In the embodiments of the present invention, as shown in FIG. 5, a user may develop the component of a native version and the component of an HTML version, and may submit same to the server via a light application platform after testing; and the server may receive and save the component of a native version and the component of an HTML version which are submitted by the user. That is, the user may develop various components according to requirements and preferences, and may upload same to the server for sharing. In such a component sharing manner, these components may not only be used by the user himself/herself, but may also be used by other users.

Furthermore, by this means, development labor division regarding a WebApp may be made more clear and definite. The user only needs to focus on service logic of the WebApp when developing the WebApp, and only needs to focus on interaction experience and performance optimization when developing the component of a native version and the component of an HTML version.

S402, an operating environment of a current web application is detected.

In the embodiments of the present invention, a WebApp may be operated via a light application platform and may also be operated via a browser. When a light component located in the current WebApp has detected that the current WebApp is operated via a light application platform, a component of a native version needs to be loaded; and when it is detected that the current WebApp is operated via a browser, the component of an HTML version needs to be loaded. Therefore, the light component needs to detect the operating environment of the current web application so as to determine the version of the component to be loaded.

S403, when it is detected that the current web application is operating on a light application platform, the component of a native version is automatically loaded; and when it is detected that the current web application is operating on a browser, the component of an HTML version is automatically loaded.

In the embodiments of the present invention, when the light component detects that the current web application is operating on a light application platform, the component of a native version may be automatically loaded via a script. Specifically, if a corresponding component of a native version exists locally, the component of a native version may be automatically loaded from the local site, for example, if a certain component of a native version has appeared in a previous WebApp, then the component of a native version may be directly loaded from the local site; and if the component of a native version does not exist locally, the component of a native version may be automatically loaded from a server. By the same reasoning, having detected that the current web application is operating on a browser, the light component may automatically load the component of an HTML version via a script. Specifically, if the component of an HTML version exists locally, the component of an HTML version is automatically loaded from the local site; and if the component of an HTML version does not exist locally, the component of an HTML version is automatically loaded from a server.

Figure 6:
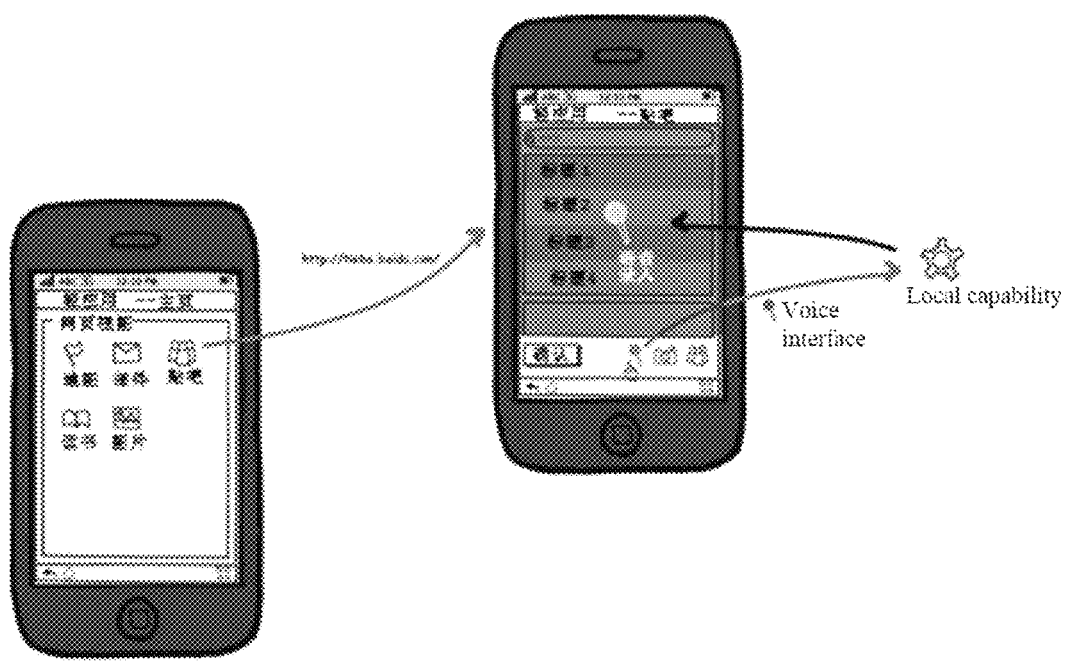
FIG. 6 is a schematic diagram illustrating that a light component automatically loads a component of a native version from the local site to implement a voice input function.

For example, as shown in FIG. 6, a user clicks to enter a post bar application, and after entering a post bar application interface, a light component automatically loads a component of a native version from the local site, and thus a voice input function in FIG. 6 can be implemented.

The component of a native version may define a parameter and an attribute via an HTML extension tag. The approach of defining a parameter and an attribute via an HTML extension tag may simplify development, reduce the difference between different platforms, and greatly improve the development efficiency.

For example, the HTML extension tag may be in the following form:

```
<html>
    <component type="album">
        <item>1.jpg</item>
    <item>2.jpg</item>
    <item>3.jpg</item>
    </component>
    <script src="WebappEx.js"> </script>
</html>
```

By means of automatically loading the component of a native version when it is detected that the web application is operating on a light application platform and automatically loading the component of an HTML version when it is detected that the web application is operating on a browser, the method for implementing a web application in the embodiment of the present invention improves the compatibility of the web application so that the web application may complete the function thereof in various environments; and adopting an HTML tag development component reduces the development costs of the web application and increases the loading speed of the web application. In addition, the sharing of the component of an HTML version via a light application platform enables the style of numerous web applications to remain consistent, thus reducing the workload of maintenance and improving user experience during upgrading and optimization.

Figure 7:
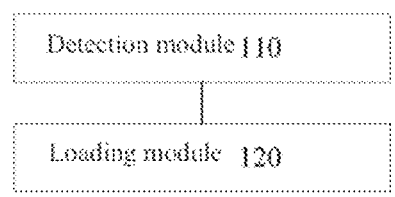
FIG. 7 is a structural schematic diagram of an apparatus for implementing a web application according to an embodiment of the present invention.

FIG. 7 is a structural schematic diagram of an apparatus for implementing a web application according to an embodiment of the present invention.

As shown in FIG. 7, the apparatus for implementing a web application comprises: a detection module 110 and a loading module 120.

The detection module 110 is used for detecting an operating environment of a current web application.

In the embodiments of the present invention, a WebApp may be operated via a light application platform and may also be operated via a browser. When a light component located in the current WebApp has detected that the current WebApp is operated via a light application platform, a component of a native version needs to be loaded; and when it is detected that the current WebApp is operated via a browser, the component of an HTML version needs to be loaded. Therefore, the detection module 110 needs to detect the operating environment of the current web application so as to determine the version of the component to be loaded.

The loading module 120 is used for automatically loading a component of a native version when the detection module 110 has detected that the current web application is operating on a light application platform; and automatically loading a component of a hypertext markup language (HTML) version when the detection module 110 has detected that the current web application is operating on a browser.

In the embodiments of the present invention, when the detection module 110 has detected that the current web application is operating on a light application platform, the loading module 120 may automatically load the component of a native version via a script. Specifically, if a corresponding component of a native version exists locally, the component of a native version may be automatically loaded from the local site, for example, if a certain component of a native version has appeared in a previous WebApp, then the component of a native version may be directly loaded from the local site; and if the component of a native version does not exist locally, the component of a native version may be automatically loaded from a server. By the same reasoning, when the detection module 110 has detected that the current web application is operating on a browser, the loading module 120 may automatically load the component of an HTML version via a script. Specifically, if the component of an HTML version exists locally, the component of an HTML version is automatically loaded from the local site; and if the component of an HTML version does not exist locally, the component of an HTML version is automatically loaded from a server.

For example, as shown in FIG. 6, a user clicks to enter a post bar application, and after entering a post bar application interface, a light component automatically loads a component of a native version from the local site, and thus a voice input function in FIG. 6 can be implemented.

The component of a native version may define a parameter and an attribute via an HTML extension tag.

For example, the HTML extension tag may be in the following form:

```
<html>
    <component type="album">
        <item>1.jpg</item>
    <item>2.jpg</item>
    <item>3.jpg</item>
    </component>
    <script src="WebappEx.js"> </script>
</html>
```

In addition, before the light component is loaded from the server, the server may receive and save the light component submitted by the user.

In the embodiments of the present invention, a user may develop the component of a native version and the component of an HTML version, and may submit same to the server via a light application platform after testing; and the server may receive and save the component of a native version and the component of an HTML version which are submitted by the user. That is, the user may develop various components according to requirements and preferences, and may upload same to the server for sharing. In such a component sharing manner, these components may not only be used by the user himself/herself, but may also be used by other users.

Furthermore, by this means, development labor division regarding a WebApp may be made more clear and definite. The user only needs to focus on service logic of the WebApp when developing the WebApp, and only needs to focus on interaction experience and performance optimization when developing the component of a native version and the component of an HTML version.

By means of automatically loading the component of a native version when it is detected that the web application is operating on a light application platform and automatically loading the component of an HTML version when it is detected that the web application is operating on a browser, the apparatus for implementing a web application in the embodiment of the present invention improves the compatibility of the web application so that the web application may complete the function thereof in various environments; and adopting an HTML tag development component reduces the development costs of the web application and increases the loading speed of the web application. In addition, the sharing of the component of an HTML version via a light application platform enables the style of numerous web applications to remain consistent, thus reducing the workload of maintenance and improving user experience during upgrading and optimization.

Figure 8:
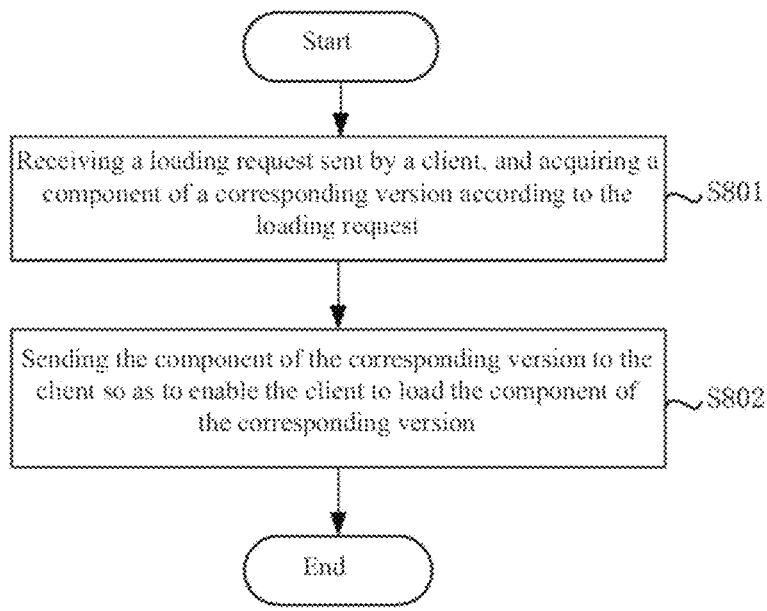
FIG. 8 is a flowchart of a method for implementing a web application according to yet another embodiment of the present invention.

FIG. 8 is a flowchart of a method for implementing a web application according to yet another embodiment of the present invention.

As shown in FIG. 8, the method for implementing a web application comprises:

S801, a loading request sent by a client is received, and a component of a corresponding version is acquired according to the loading request.

In the embodiments of the present invention, when it is detected that the current web application is operating on a light application platform, and if the component of a native version does not exist in the client, a server receives the loading request sent by the client and acquires the component of a native version according to the loading request. By the same reasoning, when it is detected that the current web application is operating on a browser, and if a component of an HTML version does not exist in the client, a server receives the loading request sent by the client and acquires the component of an HTML version according to the loading request.

S802, the component of the corresponding version is sent to the client so as to enable the client to load the component of the corresponding version.

In the embodiments of the present invention, after the server acquires the component of the corresponding version, the server may send the component of the corresponding version to the client so as to enable the client to load the component of the corresponding version.

By sending the component of the corresponding version to the client so as to enable the client to load the component of the corresponding version, the method for implementing a web application in the embodiment of the present invention improves the compatibility of the web application so that the web application may complete the function thereof in various environments; and adopting an HTML tag development component reduces the development costs of the web application and increases the loading speed of the web application.

Figure 9:
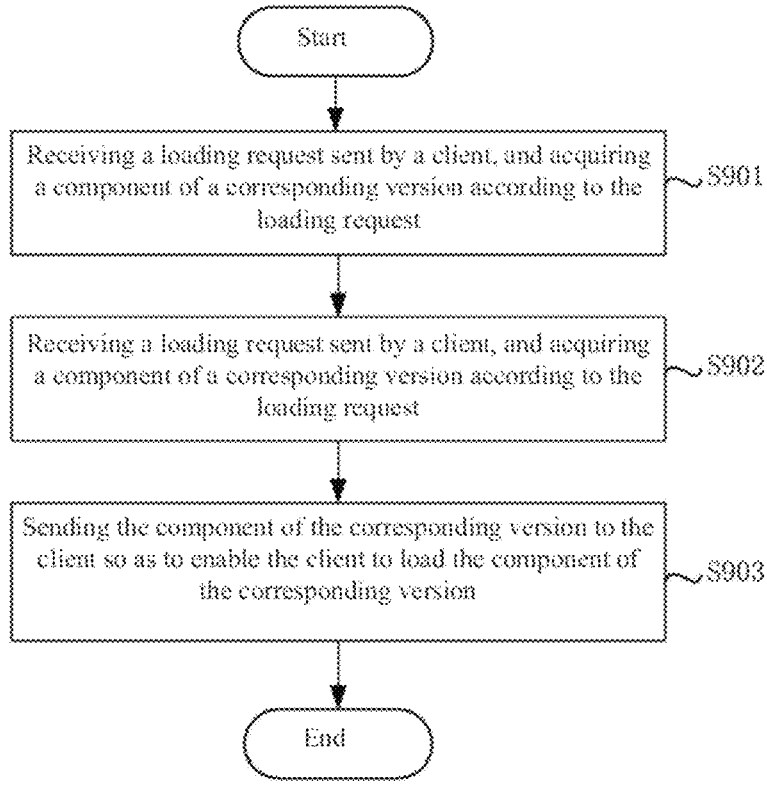
FIG. 9 is a flowchart of a method for implementing a web application according to still another embodiment of the present invention.

FIG. 9 is a flowchart of a method for implementing a web application according to still another embodiment of the present invention.

As shown in FIG. 9, the method for implementing a web application comprises:

S901, a component of a native version and a component of an HTML version are received and saved.

In the embodiments of the present invention, as shown in FIG. 5, a user may develop the component of a native version and the component of an HTML version, and may submit same to the server via a light application platform after testing; and the server may receive and save the component of a native version and the component of an HTML version which are submitted by the user. That is, the user may develop various components according to requirements and preferences, and may upload same to the server for sharing. In such a component sharing manner, these components may not only be used by the user himself/herself, but may also be used by other users.

Furthermore, by this means, development labor division regarding a WebApp may be made more clear and definite. The user only needs to focus on service logic of the WebApp when developing the WebApp, and only needs to focus on interaction experience and performance optimization when developing the component of a native version and the component of an HTML version.

S902, a loading request sent by a client is received, and a component of a corresponding version is acquired according to the loading request.

In the embodiments of the present invention, as shown in FIG. 5, a user may develop the component of a native version and the component of an HTML version, and may submit same to the server via a light application platform after testing; and the server may receive and save the component of a native version and the component of an HTML version which are submitted by the user. That is, the user may develop various components according to requirements and preferences, and may upload same to the server for sharing. In such a component sharing manner, these components may not only be used by the user himself/herself, but may also be used by other users.

S903, the component of the corresponding version is sent to the client so as to enable the client to load the component of the corresponding version.

In the embodiments of the present invention, after the server acquires the component of the corresponding version, the server may send the component of the corresponding version to the client so as to enable the client to load the component of the corresponding version.

By sending the component of the corresponding version to the client so as to enable the client to load the component of the corresponding version, the method for implementing a web application in the embodiment of the present invention improves the compatibility of the web application so that the web application may complete the function thereof in various environments; and adopting an HTML tag development component reduces the development costs of the web application and increases the loading speed of the web application. In addition, the storage of the component of the corresponding version in a server enables the style of numerous web applications to remain consistent, thus reducing the workload of maintenance and improving user experience during upgrading and optimization.

Figure 10:
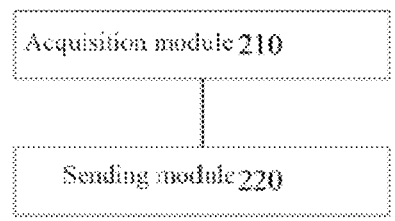
FIG. 10 is a structural schematic diagram of a server according to an embodiment of the present invention.

FIG. 10 is a structural schematic diagram of a server according to an embodiment of the present invention.

As shown in FIG. 10, the server comprises: an acquisition module 210 and a sending module 220.

Specifically, the acquisition module 210 is used for receiving a loading request sent by a client, and acquiring a component of a corresponding version according to the loading request.

The sending module 220 is used for sending the component of the corresponding version to the client so as to enable the client to load the component of the corresponding version.

Figure 11:
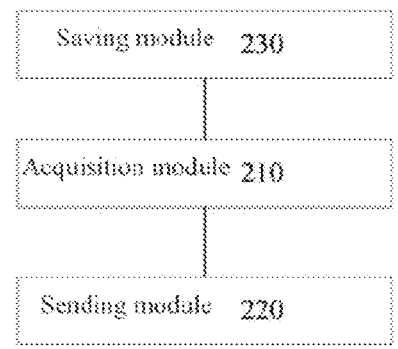
FIG. 11 is a structural schematic diagram of a server according to another embodiment of the present invention.

FIG. 11 is a structural schematic diagram of a server according to another embodiment of the present invention.

As shown in FIG. 11, the server comprises: an acquisition module 210, a sending module 220, and a saving module 230.

The acquisition module 210 and the sending module 220 are totally consistent with those described in the embodiment illustrated in FIG. 10 and will not be repeated herein redundantly.

The saving module 230 is used for receiving and saving a component of a native version and a component of a hypertext markup language (HTML) version prior to receiving, by the acquisition module, the loading request sent by the client.

By sending the component of the corresponding version to the client so as to enable the client to load the component of the corresponding version, the server of the embodiment of the present invention improves the compatibility of the web application so that the web application may complete the function thereof in various environments; and adopting an HTML tag development component reduces the development costs of the web application and increases the loading speed of the web application. In addition, the storage of the component of the corresponding version in a server enables the style of numerous web applications to remain consistent, thus reducing the workload of maintenance and improving user experience during upgrading and optimization.

Figure 12:
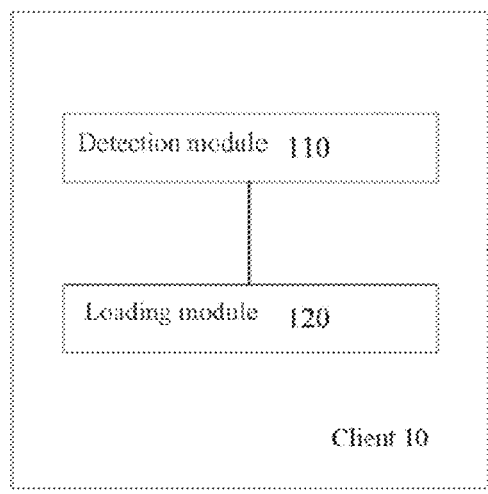
FIG. 12 is a structural schematic diagram of a system for implementing a web application according to an embodiment of the present invention.
Figure 12:
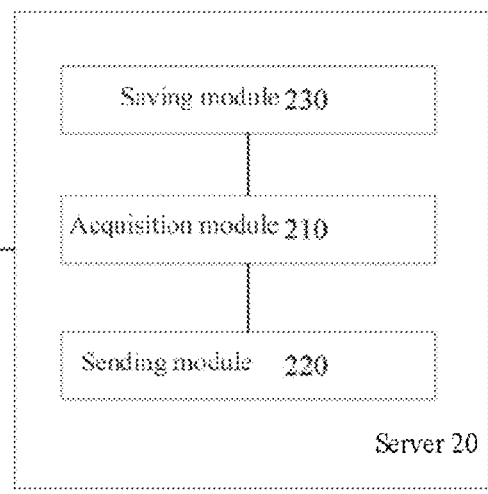

FIG. 12 is a structural schematic diagram of a system for implementing a web application according to an embodiment of the present invention.

As shown in FIG. 12, the system for implementing a web application comprises: a client 10 and a server 20.

The client 10 is the apparatus for implementing a web application in the embodiment as described in FIG. 7 and will not be repeated herein redundantly.

The server 20 is the server in the embodiment as described in FIG. 10 and will not be repeated herein redundantly.

By means of automatically loading the component of a native version when it is detected that the web application is operating on a light application platform and automatically loading the component of an HTML version when it is detected that the web application is operating on a browser, the server of the embodiment of the present invention improves the compatibility of the web application so that the web application may complete the function thereof in various environments; and adopting an HTML tag development component reduces the development costs of the web application and increases the loading speed of the web application. In addition, the storage of the component of the corresponding version in a server enables the style of numerous web applications to remain consistent, thus reducing the workload of maintenance and improving user experience during upgrading and optimization.

In addition, the terms "first" and "second" are merely for description purposes, rather than being understood to indicate or imply relative importance or implicitly specify the number of technical features indicated. Thus, a feature defined by "first" and "second" may explicitly or implicitly comprise one or more of the feature. In the description of the present invention, the meaning of "a plurality of" is two or more than two, unless clearly and specifically defined otherwise.

In the description of the specification, the description of the reference terms such as "one embodiment", "some embodiments", "an example", "a specific example" or "some examples" is intended to mean that a particular feature, structure, material or characteristic described in connection with the embodiment or example is included in at least one embodiment or example of the present invention. In the present specification, the illustrative expression of the above-mentioned terms does not necessarily relate to the same embodiment or example. Furthermore, particular features, structures, materials or characteristics described may be combined in a suitable manner in any one or more embodiments or examples. In addition, in the case of no mutual contradiction, those skilled in the art may incorporate and combine different embodiments or examples described in the present description and features of different embodiments or examples.

Although embodiments of the present invention have been shown and described above, it should be understood that the embodiments above are exemplary and shall not be understood as limitations to the present invention. Those of ordinary skill in the art may make changes, modifications, replacements and variations to the embodiments above within the scope of the present invention.

What is claimed is:

1. A method for implementing a web application, comprising:
   detecting an operating environment of a current web application on a client;
   automatically loading a component of a native version based upon a determination that the current web application is operating on a light application platform; and
   automatically loading a component of a hypertext markup language (HTML) version based upon a determination that the current web application is operating on a browser,
   wherein the light application platform is configured for developing a plurality of web applications including the current web application and includes an application installed on the client for:
      presenting a light application platform interface upon opening the application; and
   presenting the plurality of web applications on the light application platform interface as respective icons available for launching, wherein the light application platform enables the current web application to implement one or more native functions including a voice input function, a video function, an image gallery function, a list view function, or a combination thereof,
   wherein the current web application operating on the browser is not enabled to implement the one or more native functions,
   wherein said automatically loading the component of the HTML version comprises:
      judging whether the component of the HTML version exists locally;
      automatically loading the component of the HTML version from a local site based upon a judgment that the component of the HTML version exists locally; and
      automatically loading the component of the HTML version from a server based upon a judgment that the component of the HTML version does not exist locally,
   wherein the server is configured for:
      receiving a loading request from the client to load a selected component of a corresponding version selected from a group consisting of the component of the native version and the component of the HTML version;
   acquiring the selected component of the corresponding version according to the loading request;
      sending the selected component of the corresponding version to the client; and
   enabling the client to load the selected component of the corresponding version.

2. The method of claim 1, wherein said automatically loading the component of the native version includes:
   judging whether the component of the native version exists locally;
   automatically loading the component of the native version from a local site based upon a judgment that the component of the native version exists locally; and
   automatically loading the component of the native version from the server based upon a judgment that the component of the native version does not exist locally.

3. The method of claim 2, further comprising:
   receiving the component of the native version from a user; and saving the received component via the server,
wherein said receiving and said saving each occur prior to said automatically loading the component of the native version from the server.

4. The method of claim 2, wherein the component of the native version defines a parameter and an attribute via an HTML extension tag.

5. The method of claim 4, wherein said automatically loading the component of the native version from the local site includes automatically loading the component of the native version from the local site via a script.

6. The method of claim 4, wherein said automatically loading the component of the native version from the server includes automatically loading the component of the native version from the server via a script.

7. The method of claim 1, further comprising:
receiving the component of the HTML version from a user; and
saving the received component via the server,
wherein said receiving and said saving each occur prior to said automatically loading the component of the HTML version from the server.

8. The method of claim 1, further comprising receiving and saving the component of the native version and the component of the HTML version before said receiving the loading request.

9. An apparatus for implementing a web application on a client, comprising:
a processor; and
a memory having one or more programs stored thereon for instructing said processor, the one or more programs including:
instruction for detecting an operating environment of a current web application on the client; and
instruction for automatically loading a component of a native version based upon a determination that the current web application is operating on a light application platform; and
instruction for automatically loading a component of a hypertext markup language (HTML) version based upon a determination that the current web application is operating on a browser,
wherein light application platform is configured for developing a plurality of web applications including the current web application and includes an application installed on the client for:
presenting a light application platform interface upon opening the application; and
presenting the plurality of web applications on the light application platform interface as respective icons available for launching, wherein the light application platform enables the current web application to implement one or more native functions including a voice input function, a video function, an image gallery function, a list view function, or a combination thereof,
wherein the current web application operating on the browser is not enabled to implement the one or more native functions,
wherein the instruction for automatically loading the component of the HTML version comprises:
instruction for judging whether the component of the HTML version exists locally;
instruction for automatically loading the component of the HTML version from a local site based upon a judgment that the component of the HTML version exists locally; and
instruction for automatically loading the component of the HTML version from a server based upon a judgment that the component of the HTML version does not exist locally,
wherein the server is configured for:
receiving a loading request from the client to load a selected component of a corresponding version selected from a group consisting of the component of the native version and the component of the HTML version;
acquiring the selected component of the corresponding version according to the loading request;
sending the selected component of the corresponding version to the client; and
enabling the client to load the selected component of the corresponding version.

10. The apparatus of claim 9, wherein said processor is adapted for:
judging whether the component of the native version exists locally;
automatically loading the component of the native version from a local site based upon a judgment that the component of the native version exists locally; and
automatically loading the component of the native version from the server based upon a judgment that the component of the native version does not exist locally.

11. The apparatus of claim 10, wherein said server stores the component of the native version received from a user.

12. The apparatus of claim 10, wherein the component of the native version defines a parameter and an attribute via an HTML extension tag.

13. The apparatus of claim 12, wherein said processor automatically loads the component of the native version from the local site via a script.

14. The apparatus of claim 12, wherein said processor automatically loads the component of the native version from the server via a script.

15. The apparatus of claim 9, wherein said server stores the component of the HTML version received from a user.

16. A server, comprising:
a processor; and
a memory having one or more programs stored thereon for instructing said processor, the one or more programs including:
instruction for receiving a loading request sent by a client and acquiring a component of a corresponding version of a current web application according to the loading request, the component of the corresponding version being selected from a component of a native version and a component of a hypertext markup language (HTML) version, the component of the native version being configured to operate on a light application platform, the component of the HTML version being configured to operate on a browser; and
instruction for sending the component of the corresponding version to the client so as to enable the client to load the component of the corresponding version,
wherein the light application platform is configured for developing a plurality of web applications including the current web application and includes an application installed on the client for:
presenting a light application platform interface upon opening the application; and
presenting the plurality of web applications on the light application platform interface as respective icons available for launching, wherein the light application platform enables the current web application to implement one or more native functions including a voice input function, a video function, an image gallery function, a list view function, or a combination thereof, wherein the current web application operating on the browser is not enabled to implement the one or more native functions, wherein the client is configured for:
  judging whether the component of the HTML version exists locally;
  automatically loading the component of the HTML version from a local site based upon a judgment that the component of the HTML version exists locally; and
  automatically loading the component of the HTML version from the server based upon a judgment that the component of the HTML version does not exist locally.

17. The server of claim 16, wherein the one or more programs include instruction for receiving and saving the component of the native version and the component of the HTML version before said processor receives the loading request.

18. The server of claim 16, wherein the client is configured for:
  detecting an operating environment of the current web application on the client;
  loading the component of the native version based upon a determination that the current web application is operating on the light application platform; and
  loading the component of the hypertext markup language (HTML) version based upon a determination that the current web application is operating on a browser.

19. The server of claim 16, wherein the client is configured for:
  judging whether the component of the native version exists locally;
  loading the component of the native version from the local site based upon a judgment that the component of the native version exists locally; and
  loading the component of the native version from the server based upon a judgment that the component of the native version does not exist locally.

20. The server of claim 16, wherein the component of the native version defines a parameter and an attribute via an HTML extension tag.

* * * * *